United States Patent
Marks

(10) Patent No.: US 7,434,107 B2
(45) Date of Patent: Oct. 7, 2008

(54) CLUSTER NETWORK HAVING MULTIPLE SERVER NODES

(75) Inventor: Kevin T. Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 492 days.

(21) Appl. No.: 10/894,180

(22) Filed: Jul. 19, 2004

(65) Prior Publication Data

US 2006/0015537 A1    Jan. 19, 2006

(51) Int. Cl.
G06F 11/00 (2006.01)
G06F 11/20 (2006.01)

(52) U.S. Cl. .................. 714/43; 714/4; 714/44

(58) Field of Classification Search .......... 714/43, 714/4, 44
See application file for complete search history.

(56) References Cited

U.S. PATENT DOCUMENTS

| | | | | |
|---|---|---|---|---|
| 6,658,504 | B1* | 12/2003 | Lieber et al. | 710/52 |
| 6,895,480 | B2* | 5/2005 | Heil | 711/153 |
| 7,028,106 | B2* | 4/2006 | Foster et al. | 710/2 |
| 7,035,952 | B2* | 4/2006 | Elliott et al. | 710/300 |
| 7,039,741 | B2* | 5/2006 | Bakke et al. | 710/300 |
| 7,103,617 | B2* | 9/2006 | Phatak | 707/201 |
| 7,155,546 | B2* | 12/2006 | Seto | 710/100 |
| 7,320,083 | B2* | 1/2008 | Davies et al. | 714/3 |
| 2003/0037275 | A1* | 2/2003 | Bakke et al. | 714/4 |
| 2003/0061549 | A1* | 3/2003 | Nakayama et al. | 714/43 |
| 2004/0025090 | A1* | 2/2004 | Miller | 714/43 |
| 2005/0108476 | A1* | 5/2005 | Tanaka et al. | 711/114 |

OTHER PUBLICATIONS

Serial Attached SCSI—1.1 Revision 4 from Mar. 13, 2004 found at http://www.t10.org/ftp/drafts/sas1/sas1r04.pdf.*
Wikipedia's Standard RAID levels found at http://en.wikipedia.org/wiki/Standard_RAID_levels.*

* cited by examiner

Primary Examiner—Scott T. Baderman
Assistant Examiner—Joseph Schell
(74) Attorney, Agent, or Firm—Baker Botts L.L.P.

(57) ABSTRACT

A cluster network that includes multiple server nodes is disclosed. Each of the multiple nodes of the cluster network is coupled to first and second expander devices. The cluster network includes a number of storage enclosures, each of which includes dual interface and a number of dual port storage devices. Each of the dual port storage devices are coupled to each interface of the storage enclosure. Each interface is coupled to one of the expander devices. If one of the expander devices fails, the server nodes of the cluster network can access each other peer server node and each storage drive of the cluster network.

17 Claims, 3 Drawing Sheets

CLUSTER NETWORK HAVING MULTIPLE SERVER NODES

TECHNICAL FIELD

The present disclosure relates generally to the field of networks, and, more particularly, to a cluster network that includes multiple server nodes.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computers, including servers and workstations, are often grouped in clusters to perform specific tasks. A server cluster is a group of independent servers that is managed as a single system. Compared with groupings of unmanaged servers, a server cluster is characterized by higher availability, manageability, and scalability. A server cluster typically involves the configuration of a group of servers such that the servers appear in the network as a single machine or unit. At a minimum, a server cluster includes two servers, which are sometimes referred to as nodes, that are connected to one another by a network or other communication links. A storage network may be coupled to the server cluster. A storage network will typically include one or more storage devices that may or may not be shared by the servers of the server cluster. A storage network may include one or more storage enclosures, which may house a plurality of disk-based hard drives.

The servers of the cluster server may communicate with the storage network according to the Serial Attached SCSI (SAS) communications protocol. Serial Attached SCSI is a storage network interface that is characterized by a serial, point-to-point architecture. In addition, the storage of a cluster network may include some element of fault tolerant storage. One example of fault tolerant storage is RAID (Redundant Array of Independent Disks) storage. RAID storage involves the organization of multiple disks into an array of disks to obtain performance, capacity, and reliability advantages.

SUMMARY

In accordance with the present disclosure, a cluster network that includes multiple server nodes is disclosed. Each of the multiple nodes of the cluster network is coupled to first and second expander devices. The cluster network includes a number of storage enclosures, each of which includes dual interface and a number of dual port storage devices. Each of the dual port storage devices are coupled to each interface of the storage enclosure. Each interface is coupled to one of the expander devices. If one of the expander devices fails, the server nodes of the cluster network can access each other peer server node and each storage drive of the cluster network.

The cluster network disclosed herein is technically advantageous because it provides a network architecture that permits the implementation of cluster networks that include more than two nodes. As cluster networks with more than two server nodes become more common, providing a redundant communications path for peer to peer communications between these nodes is critical. The architecture of the cluster network disclosed herein provides for such a path, thereby providing a redundant communications link between the server nodes for use in failure recovery and configuration management in the cluster network.

Another technical advantage of the architecture disclosed herein is that the architecture provides for redundant access between the servers of the cluster network and the dual port SAS storage drives. Each dual port SAS storage drive of a storage enclosure is coupled to each interface of the controller. If one of the fanout expanders fails, each server can access each storage drive through the remaining fanout expander and the interface of the associated storage controller that is coupled to the remaining fanout expander. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
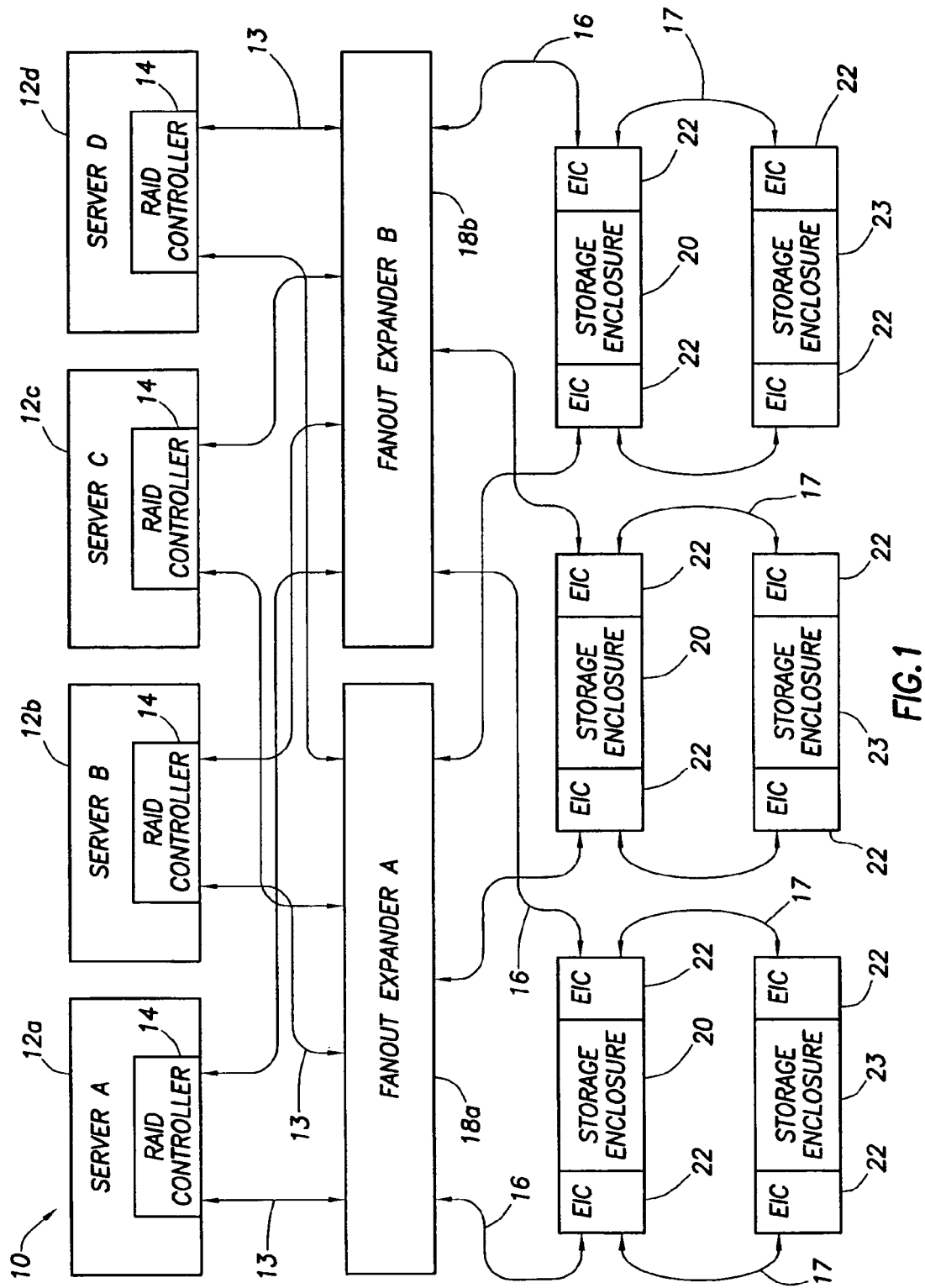
FIG. 1 is a diagram of an SAS cluster network.

Shown in FIG. 1 is cluster network, which is indicated generally at 10. Cluster network 10 includes four servers 12 arranged in a server cluster. The servers are identified as server A at 12a, server B at 12b, server C at 12c, and server D at 12d. Each server 12 includes a RAID controller 14 which may be included in each server as a card that is included in the PCI (Peripheral Component Interconnect) slot of the server. RAID controller 14 manages the data access to the drives maintained in the storage enclosures of the cluster network. RAID controller 14 may also maintain a write-back cache for storing writes to the drives managed by RAID controller 14. The RAID controller 14 of each server 12 is coupled via a communications link 13 to each of the fanout expanders 18, which are designated as fanout expander A at 18a and fanout expander B at 18b. Only one fanout expander can be used in an SAS domain. As such, fanout expander 18a cannot exist in the same SAS domain as fanout expander 18b.

The servers 12 of the cluster network communicate with one another as peer nodes. The placement of a redundant peer communications link between each of the servers 12 is used for the purpose of failure recovery and configuration management in the cluster network. The peer communications link between servers provides for the management of shared drives of the storage network, including management of the shared drives according to the SCSI reserve/release storage management method. Servers 12 must communicate with one another concerning the configuration of the RAID arrays on the drives of the storage enclosure and the assignment of drives to a RAID array. After a RAID controller of a server has reserved a set of storage drives for a RAID array, an identification of the reserved storage drives is communicated to the other servers of the storage network. With respect to failure recovery, in the event of a server failure or a planned transfer of resources between servers, a set of RAID management resources can be transferred via the peer communications link to a RAID controller of the destination server.

The servers of the cluster network also use the peer communications for the purpose of issuing status queries to each of the other servers to verify that the each other server is operating, thereby indicating that the queried server access to the storage resources of the cluster network. The use of a redundant communications link between the servers insures that the servers will be able to communicate with one another in the event of the failure of a pathway between the servers. If a non-redundant communications path between servers were to fail, the servers would not be able to communicate with each other and would not be able to verify to the other that each is operating. Without a successful verification operation, each server would attempt to take control of the other, even though each is operating and has access to the storage resources of the computer network. With respect to the write-back cache of each server nodes, the contents of the write-back cache of the respective server nodes are mirrored across the redundant peer communications link to each of the server nodes of the cluster network. The placement of a redundant peer communications link between the server nodes provides additional bandwidth for the transmission of mirrored cache data between the server nodes. The mirroring of each cache across the servers provides for the maintenance of cache coherency of each cache in the event of the failure of one of the expanders 18.

Figure 2:
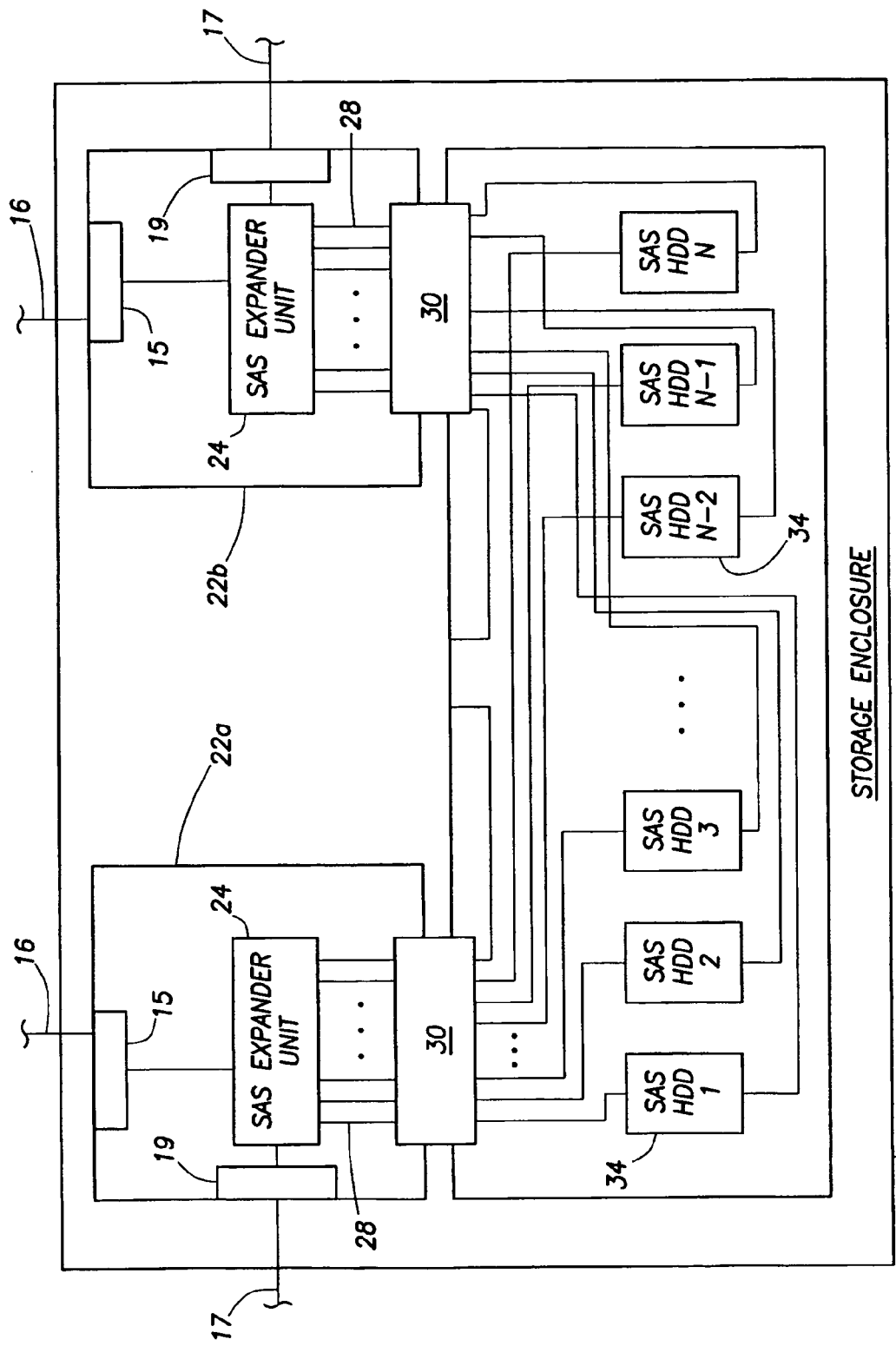
FIG. 2 is a diagram of an SAS storage enclosure that includes host ports and expansion ports.

Each fanout expander 18 includes a communication link 16 to each of three storage enclosures 20. Each storage enclosure 20 is a dual interface enclosure Each interface of storage enclosure 20 is managed by an enclosure interface controller (EIC) 22. As indicated in FIG. 1, each fanout expander 18 is coupled to each of the three storage enclosures 20. Each fanout expander is coupled to one, and only one, of the two available enclosure interface controllers of each storage enclosure 20. Shown in FIG. 2 is a block diagram of a storage enclosure 20. Storage enclosure 20 includes two enclosure interface controllers, which are identified at 22a and 22b. Each of the enclosure interface controllers 22 includes a host port 15 and an expansion port 19. Host port 15 is coupled to a host communications link 16, and expansion port 19 is coupled to an expansion communications link 17.

With reference to FIG. 1, each host communications link 16 is coupled between storage enclosure 20 and one of the two fanout expanders 18. Each expansion communications link 17 is coupled between storage enclosure 20 and one of a second set of storage enclosures 23. Host port 15 and expansion port 19 are each coupled to an expander unit 24, which will typically be comprised of one or more edge expanders. SAS expander unit 24, host port 15, and expansion port 19 comprise an enclosure interface controller 22. SAS expander unit 24 provides a switch, in the form of a cross-bar switch architecture, for routing data through host port 15 to expansion port 19. SAS expander unit 24 is coupled to a plurality of point-to-point connections 28, each of which is coupled to a connector device 30. Connector device 30 is a high speed connector that serves as a routing interface between enclosure interface controller 12 and the SAS storage drives 34. As indicated in FIG. 2, each SAS drive 34 has dual ports, allowing each of the SAS storage drives to be coupled to and accessed by each of the enclosure interface controllers 22.

Figure 3:
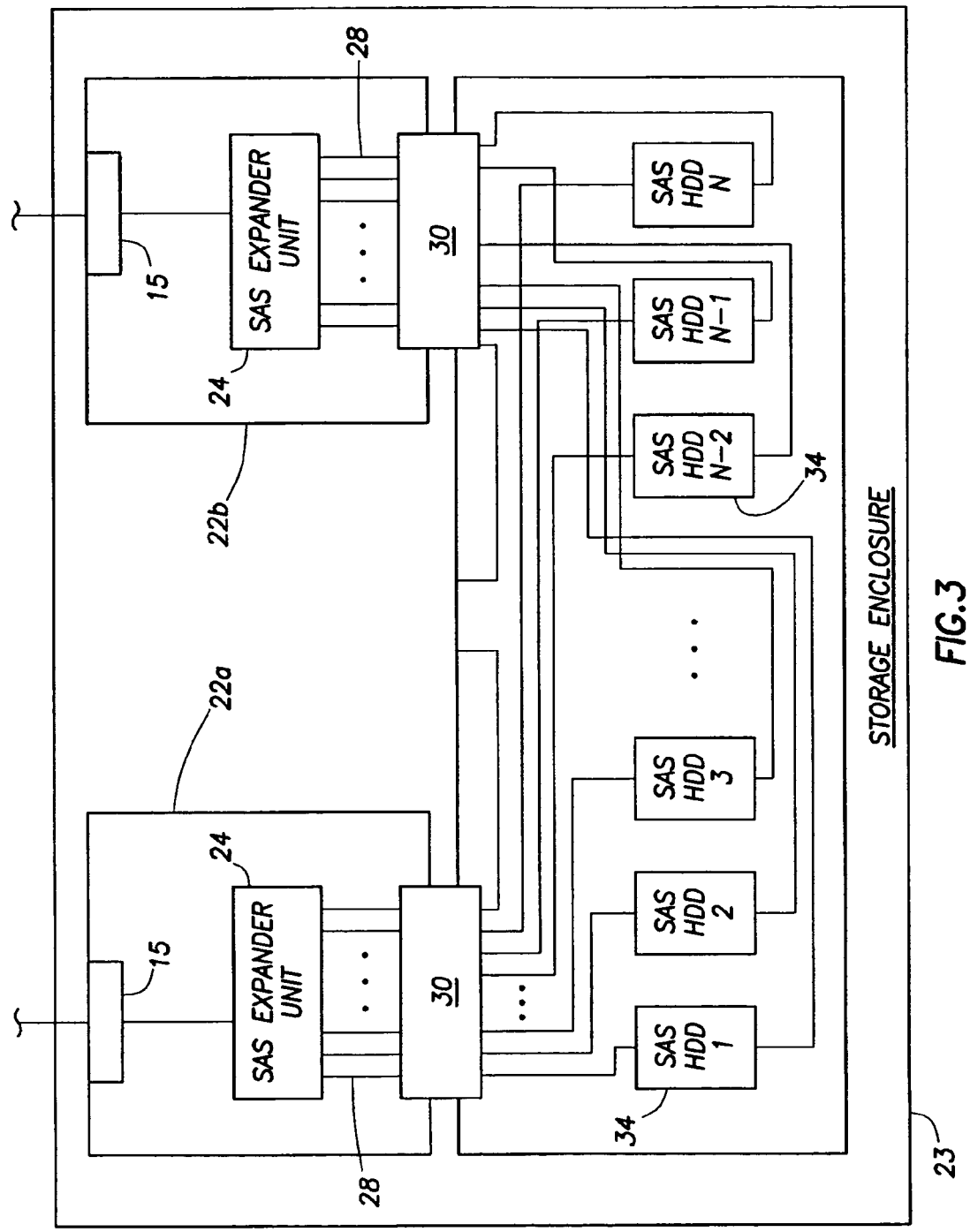
FIG. 3 is a diagram of an SAS storage enclosure that includes host ports.

As shown in FIG. 1, each expansion communications link 17 is coupled between a storage enclosure 20 and a storage enclosure 23. Like storage enclosure 20, each storage enclosure 23 is a dual interface enclosure. As shown in FIG. 1, each interface of storage enclosure 23 is coupled to an interface of a storage enclosure 20. Each interface of storage enclosure 23 is managed by an enclosure interface controller (EIC) 22. Shown in FIG. 3 is a block diagram of a storage enclosure 23. Storage enclosure 23 includes two enclosure interface controllers, which are identified at 22a and 22b. Each of the enclosure interface controllers 22 includes a host port 15. In comparison with the structure of the enclosure interface controllers of storage enclosure 20, the enclosure interface controllers 22 of storage enclosure 23 do not include an expansion port 19. Host port 15 is coupled to a communications link 17. Host port 15 is coupled to an expander unit 24, which will typically be comprised of one or more edge expanders. SAS expander unit 24 and host port 15 comprise an enclosure interface controller 22. SAS expander unit 24 is coupled to a plurality of point-to-point connections 28, each of which is coupled to a connector device 30. Connector device 30 is a high speed connector that serves as a routing interface between enclosure interface controller 12 and the SAS storage drives 34. As indicated with respect to the storage enclosure of FIG. 2, each SAS drive 34 of storage enclosure 23 has dual ports, allowing each of the SAS storage drives to be coupled to and accessed by each of the enclosure interface controllers 22. The storage drives 34 of the storage enclosures of the cluster network are organized into multiple RAID arrays, with each RAID array being managed by one of the RAID controllers 14 of the servers of the cluster network at any time. A RAID array may include drives from more than one storage enclosure. The storage enclosure 23 could be in all respects identical to storage enclosure, with the only difference being that the expansion ports of storage enclosure 23 would be uncoupled.

In operation, if one of the fanout expanders 18 of the cluster network 10 fails, servers 12 are able to communicate with one another and with each storage drive of the storage enclosures through the remaining fanout expander. For the sake of this example, assume that fanout expander A has failed. Despite the failure of fanout expander A, server A is able to communicate with server D though fanout expander B, as each of server A and server D are coupled via a communications link 13 to fanout expander B. Similarly, in the event of the failure of fanout expander A, server A may access any of the drives of any storage enclosure 20 through fanout expander B and the associated enclosure interface controller 22. In addition, in the event of a failure of fanout expander A, server A may access any drive in any of the storage enclosures 23. Server A is able to access a drive of a storage enclosure 23 through fanout expander B, an enclosure interface controller 22 of storage enclosure 20, and the associated enclosure interface controller 22 of the storage enclosure. For communications directed to a drive of a storage enclosure 23, the data of the communication is routed through an input port 15, an expander unit 24, and an output port 19 of the enclosure interface controller 22 of the storage enclosure 20.

The cluster network architecture that is disclosed herein provides for a redundant communication path between the cluster servers, and between each of the cluster servers and each of the storage drives of the network. The architecture disclosed herein includes redundant fanout expanders and dual ported SAS drives. Because of this network topology, each server can access each other server and each storage drive of the cluster network, despite the failure of one of the fanout expanders of the cluster network. The architecture disclosed herein provides for communication between server nodes to promote redundancy, including communications necessary for failover redundancy and write-back cache coherency, and network configuration management.

It should be recognized that the architecture or topology of the network disclosed herein is one example of a cluster network having an architecture of the present invention. The invention disclosed herein may be used to provide for a cluster network architecture that includes servers, expanders, and storage enclosures that are arranged in a network topology that differs from the network topology disclosed herein. Although the present disclosure has been described in detail, it should be understood that various changes, substitutions, and alterations can be made hereto without departing from the spirit and the scope of the invention as defined by the appended claims.

What is claimed is:

1. A cluster network, comprising:
    first, second, and third server computers, each server computer including a storage controller for the management of fault tolerant data storage within the cluster network;
    first and second expander units, wherein each of the first, second, and third server computers is coupled to each of the expander units; and
    a plurality of storage enclosures, wherein each storage enclosure comprises:
        a first interface coupled to the first expander unit;
        a second interface coupled to the second expander unit;
        an expander device; and
        a plurality of storage drives, each of the storage drives having dual ports, with one of each of the dual ports being coupled to one of the first interface and the second interface;
    wherein each of the first, second, and third server computers is operable to communicate with any of the other server computers and with each of the storage drives of the cluster network despite the failure of one of the first and second expander units,
    wherein the plurality of storage enclosures comprises a first plurality of storage enclosures, wherein the first interface and the second interface of a storage enclosure of the first plurality of storage enclosures each include a host port and an expansion port, wherein the host port of the first interface of the storage enclosure of the first plurality of storage enclosures is coupled to the first expander unit, wherein the host port of the second interface of the storage enclosure of the first plurality of storage enclosures is coupled to the second expander unit, and wherein the expander device of the storage enclosure of the first plurality of storage enclosures is coupled to a host port, an expansion port, and each of the storage drives of the storage enclosure of the first plurality of storage enclosures.

2. The cluster network of claim 1, wherein the storage controllers of the server computers manage the storage drives according to a RAID storage methodology.

3. The cluster network of claim 1, further comprising a second plurality of storage enclosures, wherein each storage enclosure comprises:
    a first interface coupled to the expansion port of the first interface of a storage controller of the first plurality of storage enclosures;
    a second interface coupled to the expansion port of the second interface of a storage controller of the first plurality of storage enclosures; and
    a plurality of storage drives, each of the storage drives having dual ports, with one of each of the dual ports being coupled to one of the first interface and the second interface.

4. The cluster network of claim 1,
    wherein each of the first, second, and third server computers includes a write-back cache; and
    wherein the contents of the write-back cache can be communicated to another of the servers despite the failure of one of the first and second expander units such that cache coherency between the contents of a write-back cache and the storage drives is maintained despite the failure of one of the first and second expander units.

5. The cluster network of claim 1, wherein each of the storage drives are dual ported SAS drives.

6. The cluster network of claim 1, wherein the first interface and the second interface of each of the storage enclosures include an SAS edge expander coupled to the host port and the expansion port of the interface and the storage drives of the storage enclosure.

7. The cluster network of claim 1, wherein the first and second expander units are SAS fanout expanders, and wherein each of the first and second expander units are operable to provide a communications link between each of the first, second, and third servers in the event of the failure of the other of the fanout expanders.

8. The cluster network of claim 1, wherein each server includes a storage controller for managing the storage of multiple storage drives within one or more of the storage enclosures according to a fault tolerant data storage methodology.

9. The cluster network of claim 8, wherein the storage controller of each server manages the storage of multiple storage drives within one or more of the storage enclosures according to a RAID storage methodology.

10. The cluster network of claim 9, wherein the storage drives are dual ported SAS drives.

11. The cluster network of claim 10, wherein the first expander device and the second expander device are SAS fanout expanders.

12. The cluster network of claim 11, further comprising a second set of storage enclosures, wherein each of the second set of storage drives comprises:
 a first interface;
 a second interface;
 a plurality of storage drives, each of the storage drives coupled to the first interface and the second interface;
 wherein the first interface is coupled to an expansion port of a first interface of a storage enclosure of the first set of storage enclosures; and
 wherein the second interface is coupled to an expansion port of a second interface of a storage enclosure of the first set of storage enclosures.

13. The cluster network of claim 12, wherein the each of the first interface and the second interface of the storage enclosures of the second set of storage enclosures comprises:
 a host port; and
 an expander device;
 wherein the expander device is coupled to each of the host port and storage drives of the enclosure.

14. A cluster network, comprising:
 a plurality of servers;
 a first expander device coupled to each of the servers;
 a second expander device coupled to each of the servers; and
 a plurality of storage enclosures, wherein each storage enclosures comprises:
  a first interface coupled to the first expander device;
  a second interface coupled to the second expander device; and
  a plurality of storage drives, each of the storage drives coupled to the first interface and the second interface;
 wherein the plurality of storage enclosures comprises a first set of storage enclosures, wherein the first interface and the second interface of each storage enclosure of the first set of storage enclosures each comprise:
  a host port;
  an expansion port; and
  an expander device; wherein the expander device of each interface is coupled to the host port and expansion port of the interface and the storage drives of the storage enclosure, and
 whereby each of the servers is operable to communicate with any of the other servers or any of the storage drives despite the failure of one of the first expander device or the second expander device.

15. A cluster network, comprising:
 a first server;
 a second server;
 a third server, wherein each of the first server, the second server, and the third server includes a storage controller for managing storage within the cluster network;
 a first expander device;
 a second expander device, wherein each of the first server, second server, and third server are coupled to each of the first expander device and the second expander device;
 a first storage enclosure;
 a second storage enclosure; and
 a third storage enclosure, wherein each of the first storage enclosure, the second storage enclosure, and the third storage enclosure include a first interface, a second interface, and a plurality of dual-port storage drives coupled to each of the first interface and the second interface, wherein each of the first interface and the second interface includes an expander unit;
 whereby the storage controller of the first server is operable to access the second server, the third server, and each of the storage drives of the storage enclosures despite the failure of either the first expander device or the second expander device, and wherein the storage drives of the storage enclosures comprise a plurality of RAID arrays.

16. The cluster network of claim 15, wherein the storage drives of the storage enclosures are dual-port SAS drives.

17. The cluster network of claim 15, wherein the first expander device and the second expander device are SAS fanout expanders.

* * * * *